May 8, 1951 G. J. McDONALD 2,551,805

DIVERSITY RECEPTION SYSTEM

Filed June 21, 1943 2 Sheets-Sheet 1

INVENTOR.
George J. McDonald
BY
H. S. Grover
ATTORNEY

May 8, 1951 | G. J. McDONALD | 2,551,805

DIVERSITY RECEPTION SYSTEM

Filed June 21, 1943 | 2 Sheets-Sheet 2

INVENTOR.
George J. McDonald
BY H. S. Grover
ATTORNEY

Patented May 8, 1951

2,551,805

UNITED STATES PATENT OFFICE 2,551,805

DIVERSITY RECEPTION SYSTEM

George John McDonald, Danbury, England, assignor to Radio Corporation of America, a corporation of Delaware Application June 21, 1943, Serial No. 491,706
In Great Britain April 15, 1942

Sections 3 and 1, Public Law 690, August 8, 1946
Patent expires April 15, 1962

4 Claims. (Cl. 250—20)

Figure 1:
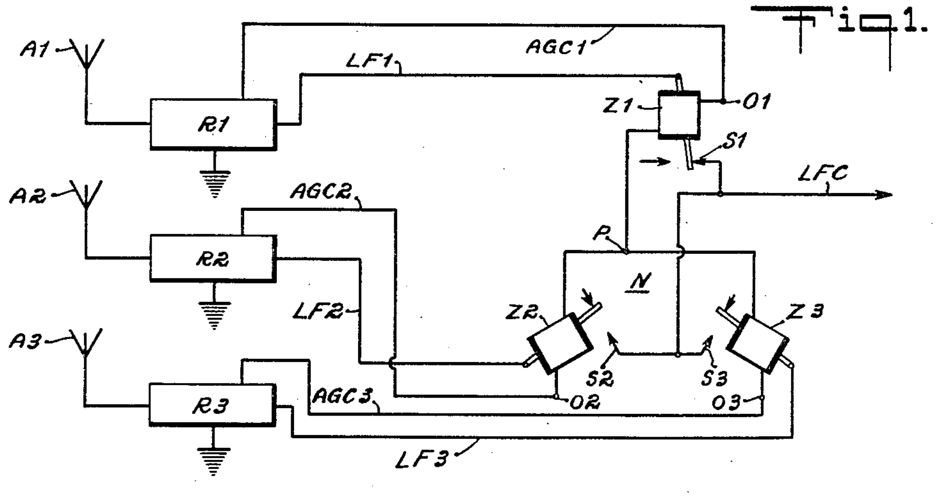

The present invention relates to radio-reception, and particularly to so-called diversity reception.

In diversity reception, a number of receivers, or at any rate, a number of receiving antennae, are situated at the receiving site, but are spaced from each other in such a manner that the effects of fading are reduced. This is because, though fading may effect one receiver or one receiving antenna at one time, it may not affect at the same time all of the receivers or receiving antennae provided.

In the majority of diversity reception systems in which a number of receivers are provided, each receiver feeding its output into a common circuit where the outputs are combined, it is usual to provide a common automatic gain-controlling system and to utilize gain-controlling voltage produced in the gain-controlling system to control simultaneously all the receivers constituting the diversity reception system. The magnitude of the control voltage at any given time is determined, principally, by the automatic gain voltage contributed to the gain-control system by that receiver, or by those receivers, which at the given time is, or are, receiving the strongest signal.

Clearly, in such a system, the overall amplification, between input and output, is the same for each of the constituent receivers of the system. Consequently, when the major source of noise is in the constituent receivers themselves and in their input circuits, each constituent receiver, irrespectively of the relative amount of useful signal it is contributing to the output of the system, contributes substantially the same amount of noise as does any other of the constituent receivers. Hence, for a diversity reception system having $n$ constituent receivers, the total noise voltage in the common output circuit is equal to $\sqrt{n}$ times that of any one constituent receiver.

Thus, the condition arises, that when, say, only one constituent receiver is contributing a useful signal, for example a signal of an amplitude considerably greater than the amplitude of the noise which it is likewise contributing, the overall ratio of signal/noise in the common output system of the whole reception system will be degraded by the presence of the noise contributed by the other receivers. In the worst case the total ratio of signal/noise is reduced by $\sqrt{n}$.

The present invention aims at overcoming this degradation of the ratio of signal/noise in the whole system as a result of too high a ratio of noise/signal in the constituent receivers.

According to the invention a diversity reception system including a plurality of constituent receivers each adapted to contribute an output signal to a common output circuit and each adapted to produce a gain-controlling potential is provided with switching means associated with each constituent receiver adapted, in response to differentiated gain-controlling potential, to eliminate from the common output circuit, output signal from that receiver which is, or from those receivers which are, receiving a signal markedly less than that received by those receivers which are, or by that receiver which is, receiving the strongest signal.

The reception system may include an impedance network comprising an impedance associated with each constituent receiver, the several impedances being alike inter se and connected in star form, and the automatic gain potentials from the several constituent receivers being separately connected to the free ends of the associated impedances.

The differentiated voltages appearing across any one of the several impedances and the common connecting point is utilized to operate the switching means associated with the constituent receiver with which the said impedance is likewise associated.

The switching means may comprise a suitably polarized or biased electromagnetic relay, one for each constituent receiver, or it may comprise an electronic valve device, one for each constituent receiver.

The automatic gain-controlling potential may be applied, in addition to being applied to the impedance network, to the constituent receiver from which it is derived.

Figure 2A:
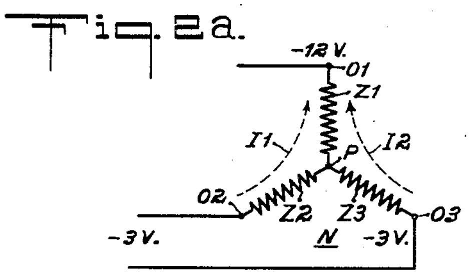
Figure 2B:
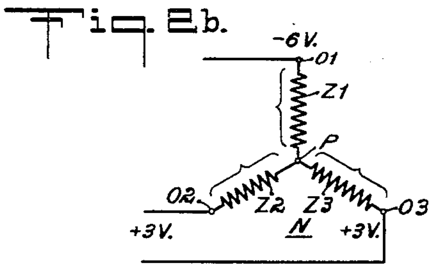
Figure 3:
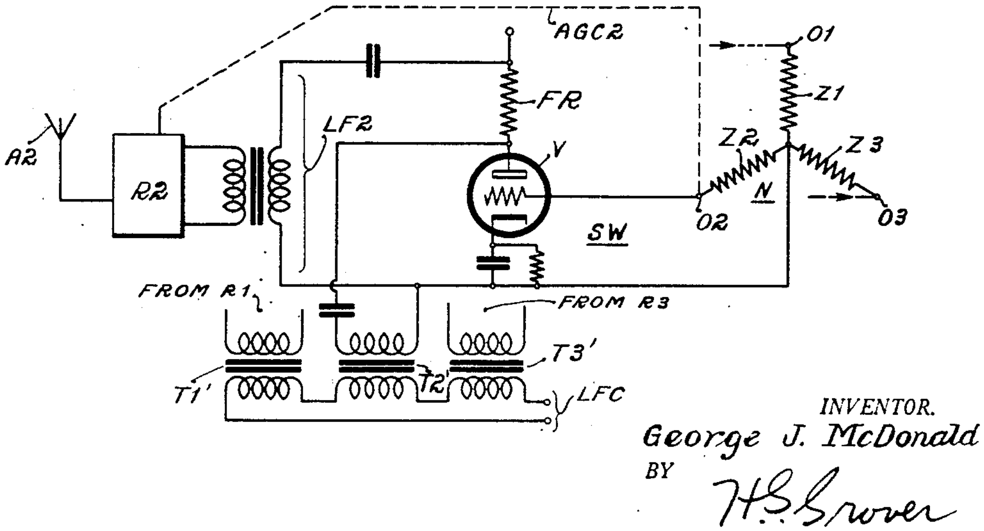
Figure 4:
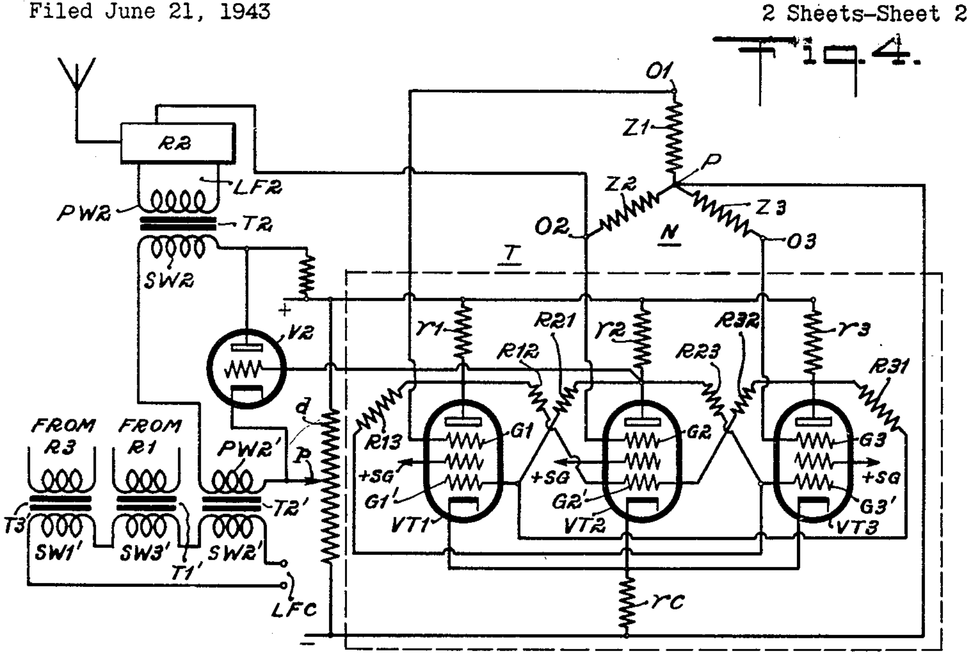
Figure 5:
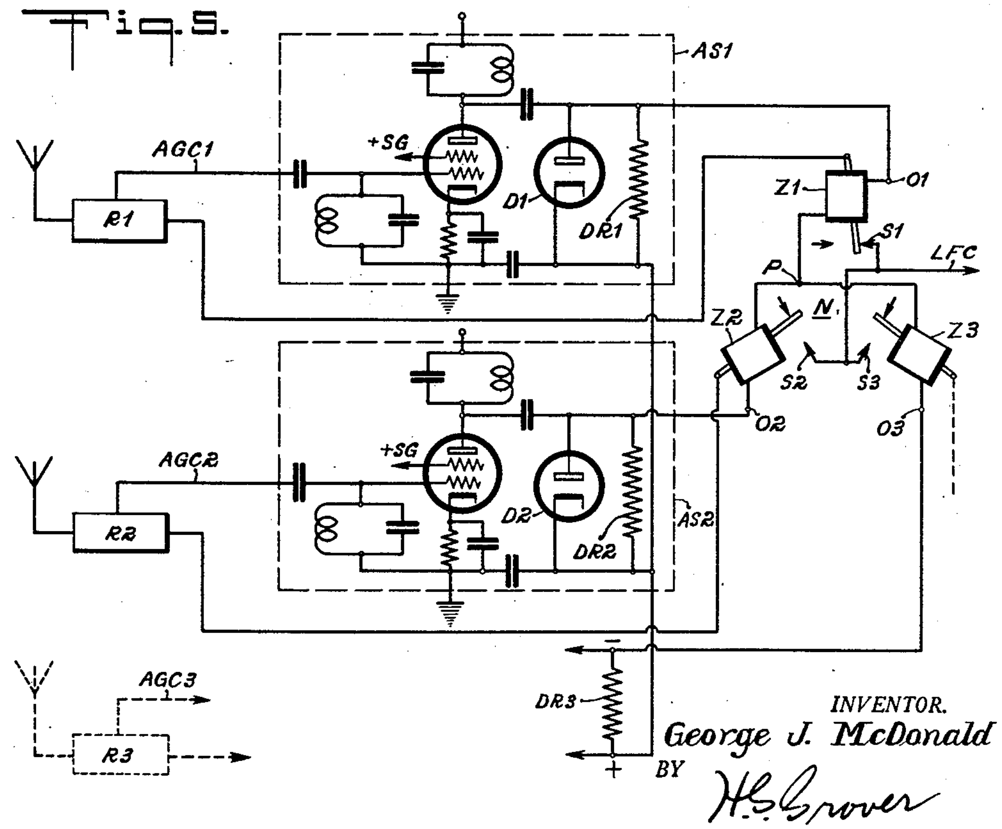

The invention is illustrated in the accompanying drawings whereof Fig. 1 shows the basic circuit for obtaining the switching voltage; Figs. 2*a* and 2*b* show impedance networks, and are used for the purpose of explanation; Fig. 3 shows the switching means for one station; Fig. 4 shows a quick acting "toggle" switching means; and Fig. 5 shows another circuit for producing the switching voltage.

For the purpose of further description of the diversity reception system of the present invention, it will be assumed that there are, as illustrated in Fig. 1, three (there may be more or there may be less) constituent receivers respectively R1, R2, and R3. In such a diversity reception system the impedance network N takes the form of Y, four-terminal network of three equal impedances Z1, Z2, and Z3, the inner ends of which are joined to a common point P, while the outer ends O1, O2, and O3 are connected over the leads AGC1, AGC2, and AGC3, to the sources (not shown but of known type) of auto-gain voltage in the three constituent receivers respectively.

The signal-output LF1, LF2, and LF3 from each of these constituent receivers is fed to a common low frequency output point LFC each output being fed through an individual switching device S1, S2, and S3. As shown, it is assumed receiver R1 output LF1 is connected by switch S1 to the output point LFC.

If, at any instant, the levels of the signal at the aerial input systems A1, A2, or A3 of the constituent receivers are, as illustrated in Fig. 2*a*, such that the auto-gain voltages applied over leads AGC1, AGC2, and AGC3 to the network N by the three constituent receivers are −12 volts, −3 volts, and −3 volts respectively, (i. e. the signal components in two of the constituent receivers are much weaker than the signal in the third constituent receiver), currents will flow, as indicated by arrows I1 and I2 through the several impedances Z1, Z2, and Z3, and the common connecting point P will assume a potential of −6 volts. The potential at the free ends O1, O2, and O3 of the impedances which constitute the impedance network N, will, with respect to the common connecting point P, regarded as at zero volts, be as indicated in Fig. 2*b*, −6 volts (at the free end of that, namely Z1, to which −12 volts was applied) and +3 volts (at the free ends of those, namely Z2 and Z3, to which −3 volts was applied), i. e. the free ends corresponding to constituent receivers with low auto-gain voltages have become positive with respect to the common connection point.

Use is made of this fact that no matter how many constituent receivers there may be the free end of the impedance Z to which is connected the highest negative potential remains negative, with respect to the common connecting point, whilst the free ends of impedances Z to which lower negative potentials are applied become positive with respect to the common connecting point.

The potentials developed across the several impedances are applied to switching means S1, S2, and S3, one for each constituent receiver, in such manner that when the free ends O1 or O2 or O3 of the impedances Z1, or Z2 or Z3 become positive with respect to the common connecting point P, the switching means is operative to isolate the output LF1, or LF2, or LF3, of the respective constituent receivers, from the common output circuit LFC. As illustrated in Fig. 1, the outputs of receivers R2 and R3 are discarded by the action of switches S2 and S3 under the control of the positive potentials at the ends of Z2 and Z3.

Thus, in the example taken, those two constituent receivers, R2 and R3, whose automatic gain-controlling potentials were −3 volts are isolated from the output circuit, and the signal/noise ratio of the final output is that given by the constituent receiver R1 whose automatic gain-controlling potential was −12 volts. In this case this is 4.3 db better than the result obtainable if all three constituent receivers had been connected in the orthodox manner.

It will be apparent that the action of this discriminator is dependent only on the relative and not the absolute signal levels in the various constituent receivers.

The switching means can take one of a variety of forms. Thus they may, for example, consist of sensitive electro-magnetic relays operated directly by the currents flowing in the constituent impedances and suitably polarized so that they operate only when the potential of the free ends becomes positive with respect to the common connecting point.

In a preferred, alternative, switching means, illustrated in Fig. 3, wherein only the switching means SW for receiver R2 is shown, the potential developed across each arm of the impedance network controls the impedance of an electronic valve V, for example by applying the developed voltage across the grid/cathode space of a triode. A fixed resistance FR in series with the anode/cathode impedance of the valve V forms a potentiometer of which the valve impedance is the variable arm. This potentiometer is connected across the output circuit LF2 of constituent receiver R2 while the connection to the combined output circuit LFC is taken, preferably by way of a transformer T2′ from across the anode/cathode space of the valve V. As the conductivity of valve V is increased, the output supplied at T′ is diminished.

In this manner it can be arranged that the fraction of the output of any one constituent receiver which is passed to the final output terminals LFC falls to a negligible value when the signal/noise ratio in that receiver falls appreciably below the signal/noise ratio in the receiver which is then receiving the strongest signal.

The switching means may be external to the constituent receivers or they can be disposed at any point in the receiver circuits which occurs after the auto-gain voltage has been derived.

It will be apparent, that in the arrangements above described, it is possible for the outputs of more than one receiver to be fed simultaneously to the common output. To avoid this, which is of little importance in telegraphy but which is undesirable in telephony since the signals contributed by the several constituent receivers may be out-of-phase and would if combined produce a distorted final output, matters may be so arranged, as will appear hereafter, that the constituent receiver, at any moment in control of the reception of signals, shall not relinquish control and thus permit another constituent receiver to assume control until the strength of the signals which it is itself receiving falls below a predetermined value, even though the strength of the signals which the other constituent receivers are receiving would otherwise be sufficient for them to contribute useful signals to the common circuit. Thus is avoided unnecessary changes from one constituent receiver to another with consequent changes in the phase of the signals in the output circuit.

Referring particularly, to the arrangement in which the potential developed across each arm of the impedance network controls the impedance of an electronic valve by supplying the voltage developed in the impedance network to the grid/cathode space thereof, there may, as illustrated in Fig. 4, be included between the impedance network N and the triodes, one only of which is shown, a so-called toggle-circuit T. Such a toggle-circuit has the additional advantage of operating very rapidly so that switching from one constituent receiver to another is effected almost instantaneously.

In the following description, it will again be assumed that there are three constituent receivers, but, again, it is to be observed that there may be more or less. The description is to be regarded as that of an exemplary arrangement which may be varied.

The toggle-circuit consists of three valves VT1, VT2, and VT3 which may conveniently be pentodes, each having its anode connected to the positive terminal + of a source (not shown) of anode current through a suitable resistor *r1*, *r2*, or *r3*. The cathodes of the valves are connected together and are connected in common, if desired, through a common resistor *rc*, to the negative terminal — of the source of current. The free ends O1, O2, O3, of the three impedances Z1, Z2, and Z3 constituting the impedance network N are connected respectively to the injector-grids G1, G2, and G3 of the three valves of the toggle-circuit. Other grids G1′, G2′, and G3′, where the valves are multi-electrode valves, of the valves of the toggle-circuit are connected respectively through resistors R21, R32, and R13 to the anodes of valves VT2, VT3, and VT1 and respectively through similar resistors R31, R12, R23 to the anodes of the valves VT3, VT1 and VT2.

The anode of any one of the valves of the toggle-circuit, say VT2 is connected to the grid of a control valve V2. The cathode of the control valve is connected to a suitable point of negative potential, which may be a point *p* on a voltage divider *d* connected across the source of anode current above referred to, and the anode of this valve V2 is connected to a positive terminal of this source. Connected in series with the anode/cathode space of the control valve V2 is the secondary winding SW2 of a transformer T2, and the primary winding PW2′ of a transformer T2′. The primary winding PW2 of transformer T2 is in the output circuit LF2 of one of the constituent receivers R2. The secondary winding SW2′ of transformer T2′ is in series with the secondary windings SW1′ and SW3′ of similar transformers T1′ and T3′ similarly associated with other constituent receivers, connected to the common output circuit LFC.

Other control valves (not shown) one for each constituent receiver (not shown) are provided, and are similarly connected. The particular control valve V2, associated with any particular constituent receiver, say R2, is that one, the control grid of which is connected to the anode of the valve VT2 of the toggle-circuit which has its injector-grid G2 connected to the free end of the impedance Z2 to which the particular constituent receiver R2 supplies automatic gain voltage over lead AGC2.

The values of the resistors in the toggle-switch, particularly those between a grid of one valve and the anodes of the other valves are such that any decrease in the current flowing through one of the valves increases the anode current taken by the other two, which in turn accelerates the initial decerase through the first valve. In the absence of changes in the externally applied control voltages from the impedance network N the system can be arranged to take up a stable condition such that two of the valves of the toggle-circuit are taking a large anode current while the third is cut off to approximately zero current. The application of a small positive increase to the potential of the control grid (or other auxiliary grid if multi-electrode valves are used) of the valve which is assumed to be cut off, will as a consequence of such application of positive potential, increase the current taken by the valve, and the process will continue until a new condition of stability is reached, such that the formerly cut-off valve will take a large anode current and one of the other two will be cut off. By omitting any inductances or capacitances from the system the speed of change-over from one condition of stability to another can be made sufficiently high to appear almost instantaneous.

Operation is such that the valve connected to the most negative point of the impedance network N is cut off while the other two are taking comparatively large currents.

Considering, as an example, the case in which number two constituent receiver R2 is contributing the strongest signal, then the free end O2 of the impedance Z2 associated with this receiver will be the most negative point of the impedance network N and hence number two valve VT2 in the toggle-circuit T will be cut-off. In this condition the potential of the anode of this valve VT2 will be more positive than that at the anodes of the other two valves VT1 or VT3 of the toggle circuit. If the cathode of the associated control valve V2 is adjusted to a potential equal to that of the anode of valve VT2 under consideration, the control valve V2 will conduct, allowing the low-frequency output LF2 from number two receiver to pass through to the common output circuit LFC. Since the anodes of the other valves VT1 and VT3 of the toggle-circuits are considerably negative in potential with respect to that under consideration (and therefore to the cathodes of their control valves) these control valves are biased off, thus preventing the L. F. output LF1 and LF3 from receivers R1 and R3, respectively, from being admitted to the combined output circuit LFC.

Thus the output at the final output terminals is that of only one receiver at any one time, even in conditions such that all three receivers are receiving equally strong signals.

When equal or nearly equal signals are arriving at all three constituent receivers, it would seem desirable to prevent the switch system from changing over unnecessarily from one to another. This can be achieved by simply reducing the sensitivity of the response of toggle system T to the voltage applied to it by the impedance network N, for example, by feeding the injector grids G1, G2, and G3 of the valves VT1, VT2, and VT3 of the toggle-circuit with small fractions of the potentials across the respective impedances Z1, Z2, and Z3 of the impedance network N. Thus, for example, the system might be set up so that one receiver was connected through to the final output LFC until the signal level at another receiver exceeded it by, say, 3 db.

It may be noted that the type of toggle-circuit described above can be extended in its application to a larger number of valves, e. g., if a quadruple diversity system were required, a further valve could be added to the toggle-system.

Furthermore, the rapid and decisive action of the toggle-circuit makes it suitable for application in a variety of ways; for example, the negative voltages developed across the anode/cathode spaces of the control valves in the above example, could, instead, be used directly to paralyze the signal rectifier or one of the low-frequency amplifier valves in the constituent receivers, methods which, on account of the threshold distortion produced when the paralyzing voltage is slightly less than the voltage of the signal, are objectionable features with gradually applied methods of switching.

The invention is susceptible to modification or elaboration. Thus, as illustrated in Fig. 5, a portion of the signal voltage from, for example, the last intermediate frequency amplifier (not shown) of each of the constituent receivers R1, R2, and R3 may be applied to a further amplifying stage (two only, namely, AS1, AS2, of which are shown) individual to the constituent receiver, and the amplified portion of signal energy rectified in, for example, a diode D1, D2, one associated with each further amplifying stage. The negative terminal of any one diode load-resistor DR1, DR2, or DR3, is connected to the free end of one impedance Z1, Z2, or Z3, in the star-connected impedance network N and the positive ends of all the load-resistors DR are connected together but are otherwise electrically isolated from other parts of the system. The common connecting point of the several impedances can thus readily be connected to any convenient point in the system, and the voltages appearing across the several impedances can be applied, as before, to the operating of the switching means, or otherwise.

I claim:

1. In a diversity receiving system, at least three radiant energy receivers having different radiant energy pick-up characteristics, a common output circuit, a separate coupling between each receiver and said circuit, a control tube in each coupling arranged to control the effectiveness of the coupling, signal strength sensing and detecting means coupled to each receiver for producing a potential, for its respective receiver, the magnitude of which is a measure of the intensity of the signal picked up by such receiver, a plurality of electron discharge devices, equal in number to the number of receivers, each having electrodes including an anode and a cathode, means coupling the cathodes of all of said devices together and to one side of a unidirectional potential source, means connecting the anode of each device through a separate load impedance to the other side of said source, means connecting the anode of each device to a first control electrode in each of the other devices, a coupling between each device and an electrode of a different one of said control tubes, and couplings between each detecting means and a second control electrode in each respective device for controlling the relative conductivities of said devices in accordance with the relative magnitudes of the produced potentials.

2. In a diversity receiving system, three radiant energy receivers having different radiant energy pick-up characteristics, a common output circuit, a separate coupling between each receiver and said circuit, a control tube in each coupling arranged to control the effectiveness of the coupling, each control tube having a control grid, signal strength sensing and detecting means coupled to each receiver for producing a potential, for its respective receiver, the magnitude of which is a measure of the intensity of the signal picked up by such receiver, three electron discharge devices each having electrodes including an anode and a cathode, means coupling the cathodes of said three devices together and to one side of a unidirectional potential source, means connecting the anode of each device through a separate load impedance to the other side of said source, means connecting the anode of each device to a first control electrode in each of the two other devices, a coupling between the anode of each device and the control grid of a different one of said control tubes, and couplings between each detecting means and a second control electrode in each respective device for controlling the relative conductivities of said devices in accordance with the relative magnitudes of the produced potentials.

3. In a diversity receiving system, at least three radiant energy receivers having different radiant energy pick-up characteristics, a common output circuit, a separate coupling between each receiver and said circuit, a triode in each coupling having its anode-cathode path connected directly in series in such coupling, signal strength sensing and detecting means coupled to each receiver for producing a potential, for its respective receiver, the magnitude of which is a measure of the intensity of the signal picked up by such receiver, a plurality of electron discharge devices, equal in number to the number of receivers, each having electrodes including an anode and a cathode, means coupling the cathodes of all of said devices together and to one side of a unidirectional potential source, means connecting the anode of each device through a separate load impedance to the other side of said source, means connecting the anode of each device to a first control electrode in each of the other devices, a coupling between each device and the control grid of a different one of said triodes, and couplings between each detecting means and a second control electrode in each respective device for controlling the relative conductivities of said devices in accordance with the relative magnitudes of the produced potentials.

4. In a diversity receiving system, three radiant energy receivers having different radiant energy pick-up characteristics, a common output circuit, a separate coupling between each receiver and said circuit, a triode in each coupling having its anode-cathode path connected directly in series in such coupling, signal strength sensing and detecting means coupled to each receiver for producing a potential, for its respective receiver, the magnitude of which is a measure of the intensity of the signal picked up by such receiver, three electron discharge devices each having electrodes including an anode and a cathode, means coupling the cathodes of said three devices together and to one side of a unidirectional potential source, means connecting the anode of each device through a separate load impedance to the other side of said source, means connecting the anode of each device to a first control electrode in each of the two other devices, a coupling between the anode of each device and the control grid of a different one of said triodes, and couplings between each detecting means and a second control electrode in each respective device for controlling the relative conductivities of said devices in accordance with the relative magnitudes of the produced potentials.

GEORGE JOHN McDONALD.

REFERENCES CITED

The following references are of record in the file of this patent:

UNITED STATES PATENTS

| Number | Name | Date |
|---|---|---|
| 2,004,126 | Moore | June 11, 1935 |
| 2,253,867 | Peterson | Aug. 26, 1941 |
| 2,269,594 | Mathes | Jan. 13, 1942 |
| 2,282,526 | Moore | May 12, 1942 |